M. DUMONT.
GEAR.
APPLICATION FILED APR. 25, 1911.
1,002,236.
Patented Sept. 5, 1911.
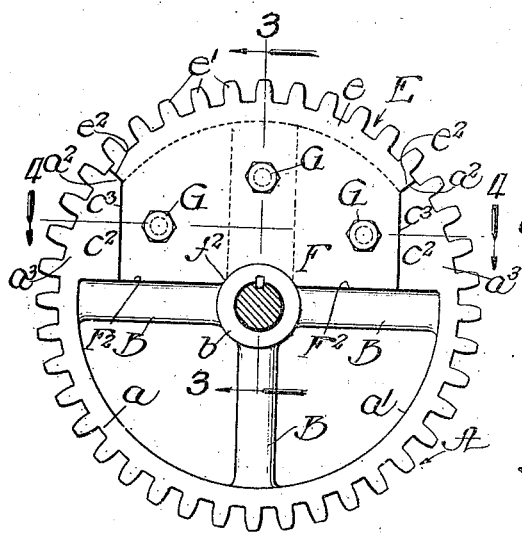
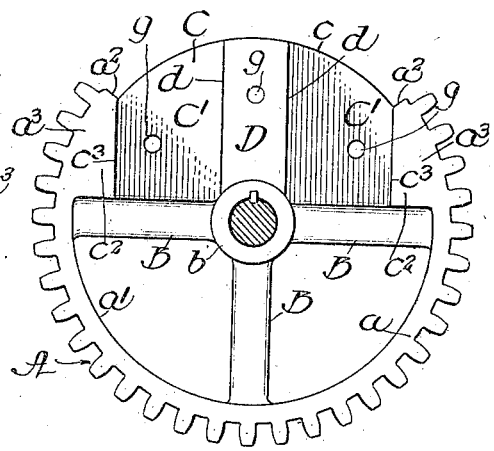
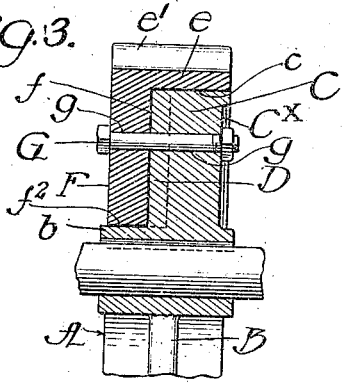
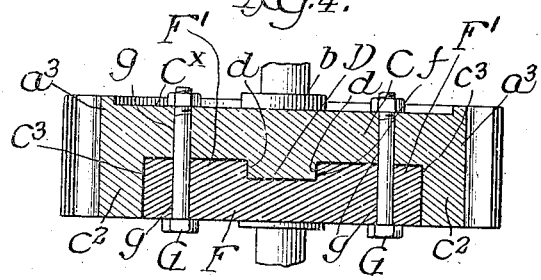
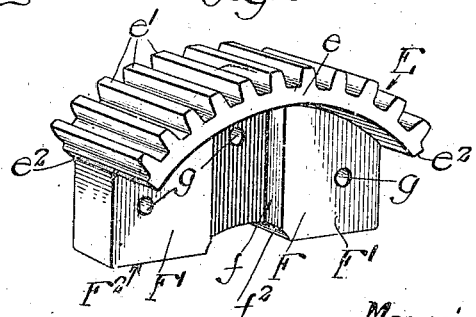
Witnesses:
Inventor.
Maurice Dumont,
by Poole & Brown Attys

UNITED STATES PATENT OFFICE.

MAURICE DUMONT, OF AURORA, ILLINOIS.

GEAR.

1,002,236.   Specification of Letters Patent.   Patented Sept. 5, 1911.

Application filed April 25, 1911. Serial No. 623,297.

*To all whom it may concern:*

Be it known that I, MAURICE DUMONT, a citizen of the United States, and a resident of Aurora, in the county of Kane and State of Illinois, have invented certain new and useful Improvements in Gears; and I do hereby declare that the following is a full, clear, and exact description thereof, reference being had to the accompanying drawings, and to the letters of reference marked thereon, which form a part of this specification.

This invention relates to an improvement in gears and consists of the matters hereinafter described and more particularly pointed out in the appended claims.

The novel features of my improvement are particularly applicable for use with gears applied to machines in which the teeth at one or more widely spaced points in the periphery of the gear are subjected to periodic shocks or strains as, for example, in a loom where the gear keyed to the crank-shaft has those teeth which are in engagement with the driving gear at the instant when the pick is operated, subjected to a sudden shock or strain once during each revolution of the gear. As a result, the gear teeth at such point or points are subjected to the greatest wear and are likely to be broken, while the rest of the gear-teeth are subjected to comparatively little wear. It will thus often happen that one or more teeth are broken at the point or points of the gear subjected to this excessive strain, while the rest of the teeth are left in good condition.

My improved gear embraces a construction in which the gear is provided with a removable section carrying a part of the teeth of the gear and when placed in the machine the gear will be so arranged that the teeth on the removable section or sections will be subjected to the periodic shock or wear, and in case of breakage it will occur in the teeth carried by the removable section or sections which may be removed and replaced without removing the gear from the machine. Manifestly my improvement will result not only in economy in the manufacture of the gears, but also in a great saving of time required to remove the entire gear and replace the same, especially when the removal of the gear requires the removal of parts adjacent to the gear in order to get at it.

In the drawings:—Figure 1 is a side elevation of a gear provided with my improvement. Fig. 2 is a side elevation of the gear with the section carrying the replaceable teeth removed. Fig. 3 is a view representing a vertical section of the gear in a plane indicated by the line 3—3 of Fig. 1. Fig. 4 is a view representing a transverse section through the gear in a plane indicated by the line 4—4 of Fig. 1. Fig. 5 is a perspective view of the removable gear section.

My improved gear comprises a body having a toothed rim provided with one or more gaps in its periphery, each adapted to be filled by a toothed rim segment carried by a gear section which is removably secured to the gear. As shown herein, the gear rim is provided with a single gap and such a gear is designed for use where the teeth at one part only of the gear are subjected to the periodic shock hereinbefore referred to. The gear has a web located adjacent the gap and provided with a shoulder extending between the ends of the gap adapted for the support of the removable section.

Referring now in detail to the drawings, A indicates the gear. Said gear has a rim $a$ provided with a gap on the upper side of the gear to receive the removable rim segment, a hub $b$ and spokes B, B, B. As shown in the drawings, the upper part of the gear, that is to say, that part on the side to be provided with the replaceable gear teeth, has an integral web C with an arcuate outer edge $c$ forming a continuation of the circle which defines the inner periphery $a^1$ of the gear-wheel rim $a$, and providing a shoulder for the support of the removable gear section. Said web is made rigid with the two adjacent wheel spokes B, B, with the hub and with the parts $a^3$, $a^3$ of the gear-wheel rim $a$ which extend beyond the ends of said spokes on the side of the gear occupied by said web. The rear face $C^x$ of said web C, as shown herein, is located in or near the plane of the rear face of the gear, and the lateral parts $c^2$, $c^2$ of said web located adjacent the parts $a^3$, $a^3$ of the rim $a$ have their front faces in or near the plane of the front face of said gear. Intermediate said lateral parts $c^2$, channels or grooves $C^1$, $C^1$ are formed in the front face of the web, which channels or grooves are separated by a radial rib D which divides the gap in the gear rim $a$ into equal parts. The lateral edges $d$, $d$ of the rib D are parallel to the diameter of the gear extending centrally through said rib, and the outer lateral walls $c^3$, $c^3$ of the channels $C^1$, $C^1$ are parallel to the lateral edges of said rib. The rim $a$ of the gear terminates in radial shoulders $a^2$, $a^2$ the edges of which intersect the lateral walls $c^3$, $c^3$ of the channels $C^1$, $C^1$, and which define the ends of the gap in said rim.

E indicates the removable section of the gear. Said section comprises a segmental rim $e$ provided with gear teeth $e^1$ which rim is adapted to fill the gap between the shoulders $a^2$, $a^2$ in which the rim of the main gear terminates, and a body member F having a flat front face and a rear face provided with ribs $F^1$, $F^1$ adapted to engage within the channels $C^1$, $C^1$ in the web C of the gear, said ribs being separated by a channel $f$ which is adapted to receive the rib D of said web. The segmental rim $e$ projects rearwardly beyond the rear face of the body member F, thus forming a shoulder or offset which is adapted to bear upon the arcuate edge or shoulder $c$ of the web C of the main gear. The ends $e^2$, $e^2$ of said rim segment are radial to the gear and are adapted to bear against the radial shoulders $a^2$, $a^2$ in which the main rim of the gear terminates. The bottom edge $F^2$ of the removable section is adapted to bear on the upper edges of the spokes B, B, and is provided with a rounded groove $f^2$ adapted to bear on the hub $b$ of the gear. When the removable section of the gear is in place, it is rigidly held there by means of bolts G which extend through apertures $g$, $g$, formed, respectively, in the body of said removable section and in the web C of the gear.

As shown herein, the removable section may be removed from the main gear after the bolts G have been removed, either in a direction parallel to the central axis of the gear; that is to say, in a direction at right angles to the face of the gear, or it may be removed radially in the plane of the gear. The manner in which the removable section will be taken from the gear will depend upon the nature of the machine in which the gear is used, and the position of the gear with reference to adjacent parts of the machine.

While in describing one embodiment of my invention I have referred to certain details of mechanical construction, it is to be understood that my invention is not limited thereby except as may be pointed out in the appended claims.

I claim as my invention—

1. A gear comprising a body having a hub, an annular toothed rim provided with a gap and means connecting said rim and hub including a web having an arcuate shoulder extending between the ends of said gap, a removable section having a toothed rim segment adapted to fill said gap and a body member adapted for engagement against said web, said body member being offset to provide an arcuate shoulder adapted to rest upon the shoulder of said web and said body member and web being respectively provided with interlocking grooves and ribs, the lateral edges of said grooves and ribs being parallel with the radius of said gear separated by equal angles from the ends of said gap, and means for removably securing said gear section to said gear.

2. A gear comprising a body having a hub, an annular toothed rim provided with a gap with radial shoulders at the ends of said gap, and means connecting said rim and hub including a web having an arcuate shoulder extending between the ends of said gap, a removable section having a toothed rim segment adapted to fill said gap and a body member adapted for engagement against said web, said body member being offset to provide an arcuate shoulder adapted to rest upon the shoulder of said web and said body member and web being respectively provided with interlocking grooves and ribs, the lateral edges of said grooves and ribs being parallel with the radius of said gear separated by equal angles from the ends of said gap, said body member having an annular transverse groove adapted to receive said hub, and means for removably securing said body member to said web.

In testimony that I claim the foregoing as my invention I affix my signature in the presence of two witnesses, this 17th day of April A. D. 1911.

MAURICE DUMONT.

Witnesses:
 TIM BIEVEN,
 ALBERT T. MALL.